United States Patent [19]

Tone

[11] Patent Number: 4,913,015
[45] Date of Patent: Apr. 3, 1990

[54] SOFT MATERIAL CUTTING APPARATUS
[75] Inventor: Hideo Tone, Saitama, Japan
[73] Assignee: Kokusan Kogyo Kabushiki Kaisha, Saitama, Japan
[21] Appl. No.: 248,810
[22] Filed: Sep. 23, 1988
[30] Foreign Application Priority Data Sep. 26, 1987 [JP] Japan .................. 62-242349
Sep. 26, 1987 [JP] Japan ............... 62-146698[U]

[51] Int. Cl.$^4$ .............................. B26D 7/00
[52] U.S. Cl. ......................... 83/100; 83/620; 83/650
[58] Field of Search ............... 83/24, 27, 39, 40, 49, 83/52, 214, 277, 620, 621, 100, 102, 107, 402, 650, 272, 44, 45, 46, 47; 242/67.1 R

[56] References Cited

U.S. PATENT DOCUMENTS

| | | | |
|---|---|---|---|
| 3,088,353 | 5/1963 | Hanington | 83/100 X |
| 3,107,566 | 10/1963 | Archer | 83/40 X |
| 3,416,396 | 12/1968 | Donner | 83/620 X |
| 3,802,307 | 4/1974 | Oggoian | 83/96 |
| 4,344,342 | 8/1982 | Garvin | 83/45 |
| 4,773,293 | 9/1988 | Mizuta et al. | 83/39 |

Primary Examiner—Frank T. Yost
Assistant Examiner—Eugenia A. Jones
Attorney, Agent, or Firm—Flynn, Thiel, Boutell & Tanis

[57] ABSTRACT

An apparatus for cutting soft sheetlike material, such as a fabric material, which is subject to elongation due to effect of tensile force. The apparatus has a driving device for supplying a layered severable material in an intermittent step-like manner from an upper position to a lower position. A cutting device cooperates with the layered severable material, when in a stationary vertically-suspended condition, for forming cutting lines of basic configuration therein along the elongate direction thereof, with such cutting lines being repeatedly formed following each advancing step of the material to create cutting lines which extend substantially continuously along the severable material. Devices are also provided for removing unwanted portions of the severable material so as to leave only an essential portion. The severable material includes superimposed sheets of flexible soft material and thin flexible backing, which sheets are separated and independently wound following the cutting step.

5 Claims, 6 Drawing Sheets

FIG.10
FIG.9
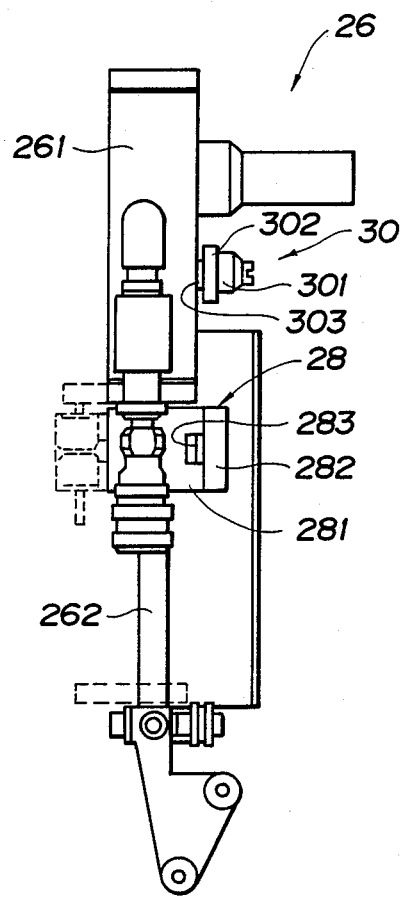
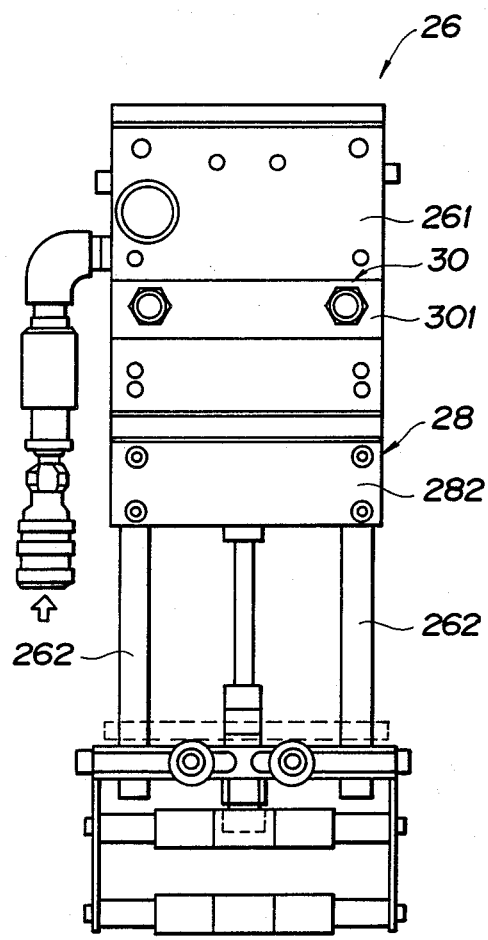

SOFT MATERIAL CUTTING APPARATUS

CROSS REFERENCE TO RELATED APPLICATION

This application is related to my copending application Ser. No. 248,812, filed concurrently herewith, [atty ref: Saigoh Case 75] and entitled "APPARATUS FOR CONTINUOUSLY CUTTING SOFT MATERIAL SUBJECT TO ELONGATION BY TENSILE FORCE". The disclosure of this latter application is, in its entirety, incorporated herein by reference.

FIELD OF THE INVENTION

The present invention relates to an apparatus for cutting soft material and, more particularly, to an apparatus which is capable of properly and precisely forming cutting lines on the surface of soft material to facilitate the cutting-line forming operation so that precision of the configuration of the essential cutout portion can be achieved.

BACKGROUND OF THE INVENTION

A variety of electronic computers are available for processing information and various data. Conventionally, computers use floppy discs as a media for external memory storage. Each floppY disc is made from a flexible magnetic disc which is sealed inside of a jacket or liner. The liner is normally made from soft sheetlike material such as a non-woven fabric. The liner protects the floppy magnetic disc from dust and, at the same time, provides the disc with an adequate amount of rotation torque.

The soft material which makes up the liner is inherently subject to elongation from the effect of tensile force. When producing liners by continuously cutting soft material which is subject to elongation due to the effect of tensile force, extreme care should be exercised to prevent the liner from incurring elongation, severance, and distortion caused by such tensile force. To prevent this, conventionally a cutting line of the basic pattern is sequentially and individually formed, either from above or from below, on the surface of soft material as it is conveyed in the horizontal direction, followed by removal of useless portions until only the essential portion remains for eventually making up the liner.

Nevertheless, when cutting soft material which is subject to elongation due to the effect of tensile force while conveying it in the horizontal direction, the cutting operation may be executed against the soft material which is already elongated by tensile force. Elongation causes the above soft material to incur distortion and slack, and as a result, any of conventional cutting apparatuses cannot properly and precisely form cutting lines, thus eventually lowering the precision of the cutout essential portion which constitutes the liner.

An object of the invention is to overcome the problems mentioned above by providing an apparatus for cutting continuous sheetlike soft material which is capable of properly and precisely forming cutting lines on the surface of soft material to promote precision of the finished-up essential portion after executing successive cutting operations to effect formation of cutting lines on both the left and right sides of the soft material as it is vertically conveyed in a downward direction.

To achieve the above object, the soft material cutting apparatus related to the invention is substantially comprised of an operation unit which supports a mold for forming cutting lines on the surface of soft material as it is vertically conveyed in a downward direction, and a driver unit which drives the operation unit horizontally in a reciprocal manner.

The soft material cutting apparatus related to the invention sequentially executes the operations including continuous supply of soft material from an upper position to a lower position and formation of cutting lines on the left and right sides of the soft material by operating the cutting-line forming mold supported by the operation unit. The conveying system of the apparatus causes the soft material to be supported and suspended in the vertically downward direction. This prevents soft material from incurring distortion and slack. Consequently, the apparatus can properly and precisely form cutting lines on the surface of soft material, thus eventually resulting in the desired precision of the essential cutout portion.

BRIEF DESCRIPTION OF THE DRAWINGS

FIGS. 9 and 10 are side elevational views of the driver for the fabric.

DETAILED DESCRIPTION

Figure 1:
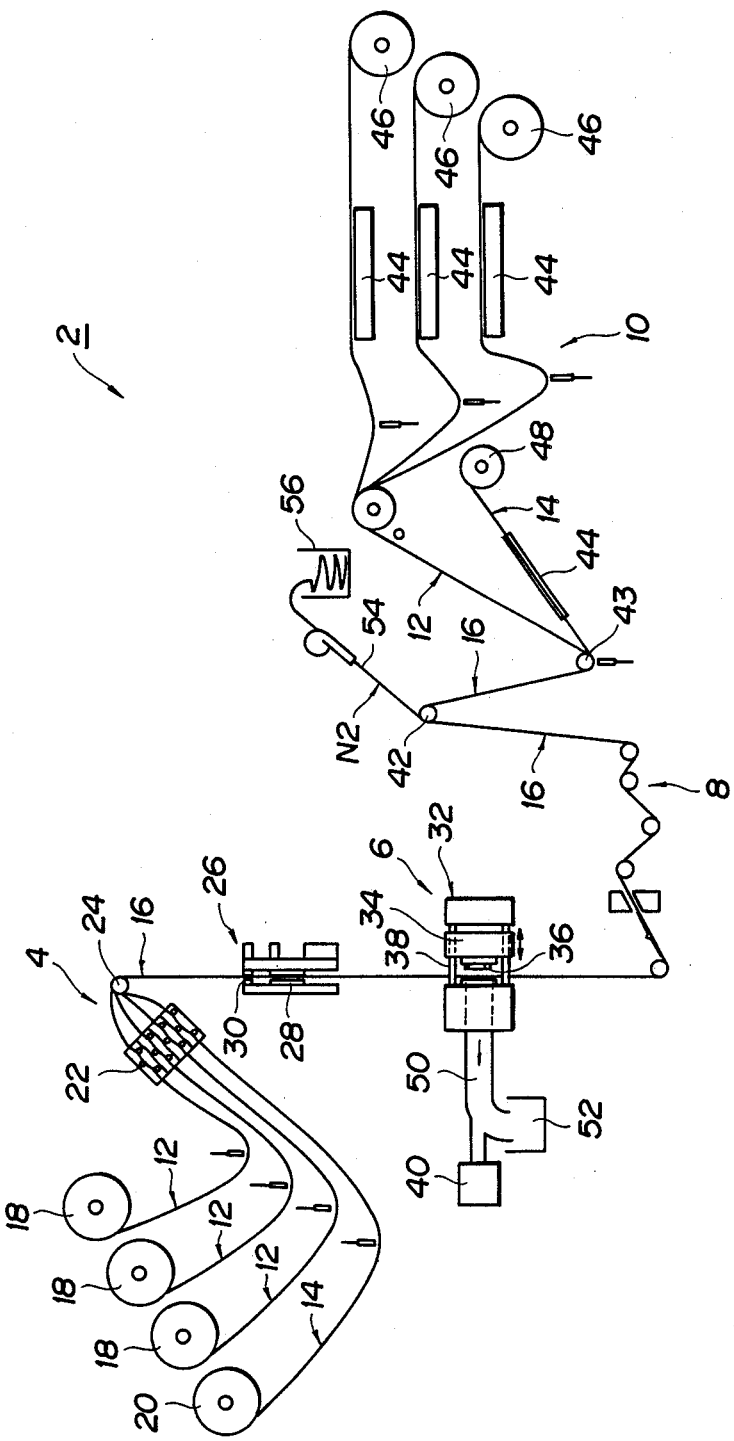
FIG. 1 is the simplified schematic diagram of a continuous material cutting apparatus related to the invention.
Figure 2:
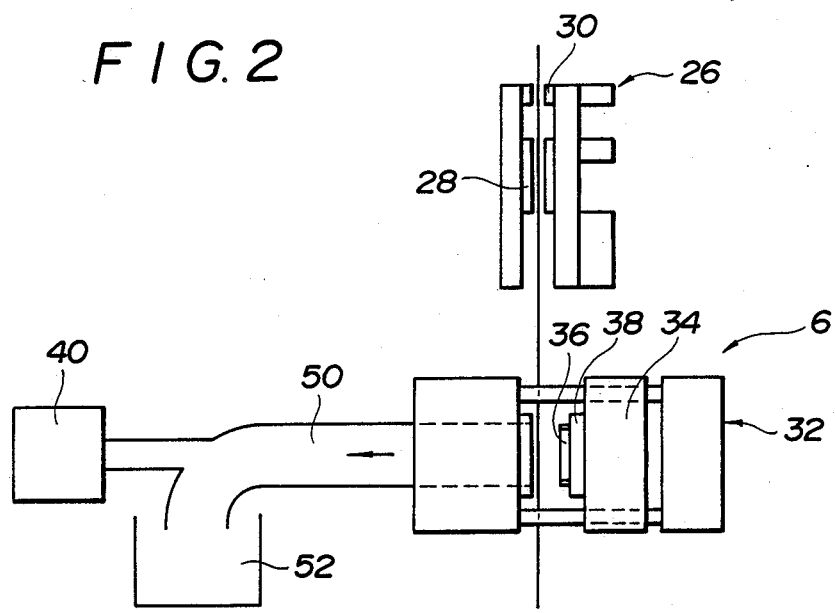
FIG. 2 is the enlarged sectional view of cutting-line forming means related to the invention.

The apparatus 2 for continuously cutting thin, flexible, elongate soft-material fabric is provided with means 4 for supplying a severable member, means 6 for continuously forming cutting lines constituting the cutting apparatus related to the invention, means 8 for removing useless portions, and means 10 for winding up the severable member.

Means 4 vertically feeds a severable member 16 in a downward direction. This member 16 is formed of superimposed layers including at least one layer of soft-material fabric 12, such as a non-woven fabric which elongates in the presence of tensile force, and at least one layer of solid non-extendable base material 14 (such as a thin flexible kraft paper) which inhibits elongation of soft-material fabric 12 due to tensile force. Means 4 for supplying severable member 16 is substantially composed of the following: one or more rollers 18 respectively winding original soft-material fabric 12; one or more rollers 20 respectively winding original solid base materials 14; a tension generator 22 which provides each piece of soft-material fabric 12 and solid base material 14 with a specific amount of tension; a supply roller 24 which feeds the severable member 16 so that the layers are properly arranged in a row by the effect of adequate tension as received from tension generator 22; and air feeder 26 which feeds the severable member 16 from an upper position to a lower position in a steplike manner by applying air pressure. The air feeder 26 is substantially composed of (1) a reciprocating conveying device 28 which moves itself in the vertical direction to feed the severable member 16 from the upper position to the lower position at a specific interval by grasping the severable member 16 during the descending movement and (2) a material retaining device 30 which prevents the severable member 16 from freely moving itself while the conveying device 28 ascends. The airfeeder 26 orients the direction for supplying the severable member 16 in the descending direction within specific angles including perpendicularity.

Figure 6:
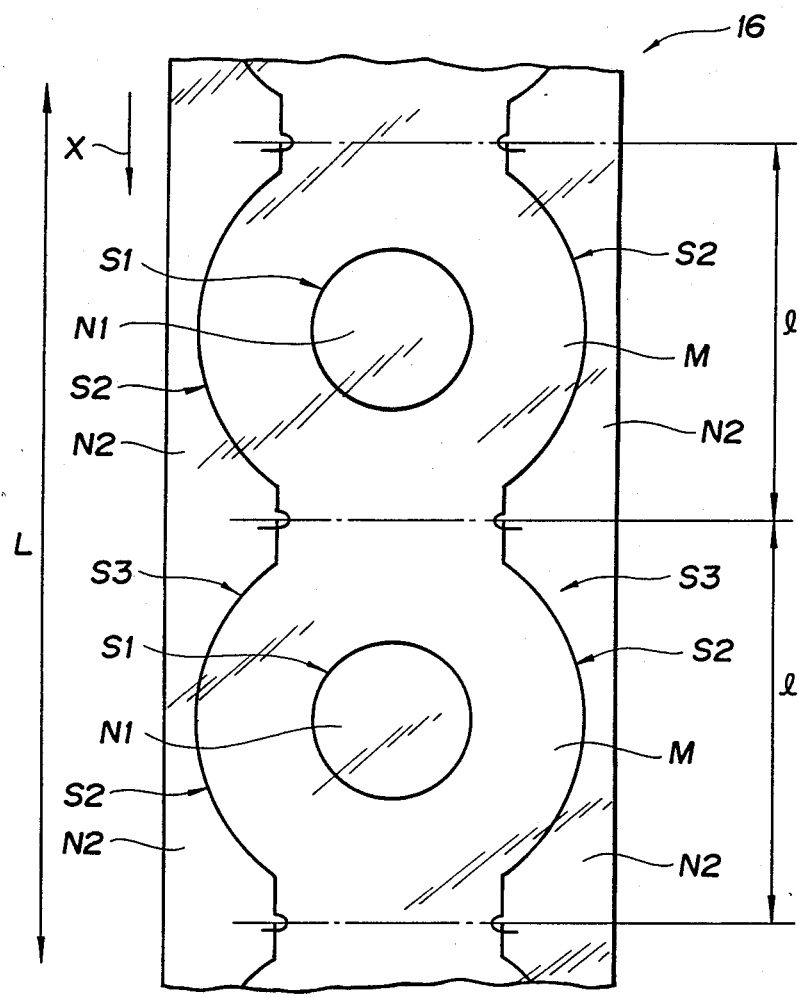
FIG. 6 shows the predetermined cutting lines formed on the severable member related to the invention.

Means 6 repeatedly forms cutting line S1 in the center of the severable member 16 and cutting lines S2 and S2 of the basic pattern covering the predetermined length l shown in FIG. 6 on the surface of the severable member 16 which is vertically conveyed in the downward direction at a specific interval by the conveying means 28 of the supply means 4 so that cutting lines 52 can continuously be reproduced in the edge portions of the severable member for eventually shaping the required continuous cutting line S3 covering the entire length L of the severable member 16.

Means 6 for continuously forming cutting lines on the surface of severable member 16 is substantially composed of (1) driver unit 32 composed of a crank mechanism, (2) operation unit 34 which is mounted to the driver unit 32 so that it can reciprocate itself to the left and to the right synchronous with the vertical movement of the conveying device 28 of air-feeder 26, and (3) cutting-line forming mold 38 which is mounted to the operation unit 34 and provided with blade 36 for forming cutting lines S1 and S2/S2 of the basic pattern. The driver unit 32 is driven by, e.g., an electric motor or the like and consists of a crank mechanism having a rotor which is rotated by this motor, and a rod in which one end is supported on the rotor and the other end is supported on the operating member 34 so as to effect the desired reciprocal movement of member 34.

Figure 7:
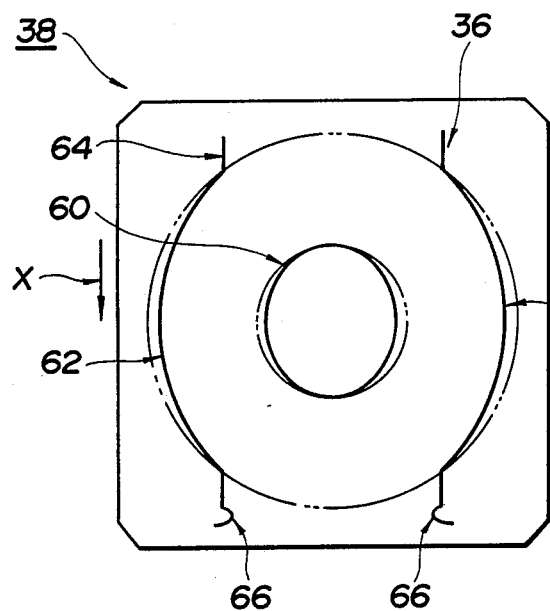
FIG. 7 is the front view of the cutting-line forming mold related the invention.
Figure 8:
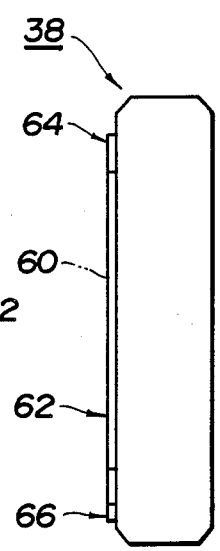
FIG. 8 is the side view of the cutting-line forming mold.

Concretely, in order to provide a predetermined hole constituting a center hole of a floppy disc, like the one shown in FIG. 6, the blade unit 36 is substantially composed of the following: blade 60 generates cutting line S1 for severing useless portion N1 from the center of soft-material fabric 12, and a pair of circular-edge cutting blades 62 and 62 are respectively of arc-shape approximately matching the circular configuration of the floppy disc itself and disposed in the direction identical to direction X in which soft-material fabric 12 is conveyed; these blades 62 and 62 form continuously cutting lines S2 and S2 for severing useless side portions N2 and N2 from the essential portion M which constitutes the liner itself (see FIGS. 7 and 8). In addition, these blades 62 and 62 are respectively provided with linearly-formed first auxiliary blades 64 and 64 which project from one ends of blades 62 and 62 and curved second auxiliary blades 66 and 66 which project from the other ends of blades 62 and 62 as shown in FIGS. 7 and 8 for repeatedly and continuously connecting the following cutting lines S2 and S2 of the basic pattern to the preceding cutting lines S2 and S2 of the basic pattern covering a specific length l of soft-material fabric 12 as shown in FIG. 6. Consequently, when continuously forming the basic pattern of the liner, the cutting-line forming mold related to the invention allows the following cutting lines S2 and S2 of the basic pattern to be securely connected to the preceding cutting lines S2 and S2 of the basic pattern by causing the second auxiliary blades 66 and 66 to repeatedly and continuously follow up the preceding cutting lines S2 and S2 of basic pattern generated by the first auxiliary blades 64 and 64. This eventually allows cutting line S3 matching the required configuration to be continuously formed throughout the entire length L of soft-material fabric 12.

Since the soft-material fabric 12 may still experience a slight elongation by effect of tensile force while being cut, blade 60 which cuts the center circular hole edge and blades 62 and 62 which jointly cut the external circumferential edge may be provided with a slightly narrower width in the lateral direction as shown by solid lines in FIG. 7. Consequently, when completing the liner processing operation, the soft-material fabric 12 is then subjected to slight contraction so that the liner can eventually be processed into the predetermined configuration as indicated by dash-dot lines in FIG. 7.

Useless portion removal means 8 removes useless circular portion N1 from the center and useless irregular side portions N2/N2 from both sides of the severable member 16 as separated from the essential portion M. Means 8 is provided with air-suction system 40 which interconnects with the driver unit 32 and sucks the useless circular portion N1 by blowing air against it so that it can be removed from the center of severable member 16 while forming cutting lines S1 and S2/S2 of the basic pattern on this member 16.

Severable-member winding means 10 separately takes up soft-material fabric 12 and solid base material 14 from the superimposed severable member 16, after removal of the useless portions N1 and N2/N2 so as to leave only the essential portion M. Means 10 is substantially composed of (1) a slack sensor 44 which is set to a position close to roller 43 and detects a slack condition of the base material 14, (2) a plurality of soft-material takeup rollers 46, and (3) one or more solid base material takeup rollers 48. The apparatus related to the invention also provides path 50 for conveying useless portion N1 and container 52 for storing useless portions cut off from the severable member 16, and path 54 and container 56 for the cutoff portions N2/N2.

The functional operation of the apparatus related to the invention is described below. Supply means 4 first unwinds soft-material fabric 12 and solid base material 14 from rolls 18 and rolls 20 respectively, and then straightens both of the unwound fabrics with a specific amount of tension generated by tension generator 22. Roller 24 then superimposes the layers of soft-material fabric 12 with the layer of solid base material 14 to constitute a continuous severable member 16. The superimposed layers defining the severable member 16 is then vertically conveyed by air-feeder 26 in the downward direction, i.e., by operating the reciprocal conveying device 28, at a specific interval. While the conveying device 28 ascends, the material retainer 30 holds the severable member 16 to prevent it from freely moving itself. The air-feeder 26 orients the direction for supplying the severable member 16 in the descending direction within specific angles including perpendicularly.

By vertically feeding the continuous severable member 16 downwardly in a suspended condition, the apparatus securely prevents the soft-material fabric 12 from incurring elongation, severance, and distortion by virtue of the superimposition of the soft-material fabric 12 with the solid base material 14 which inhibits elongation of the fabric 12.

Figure 3:
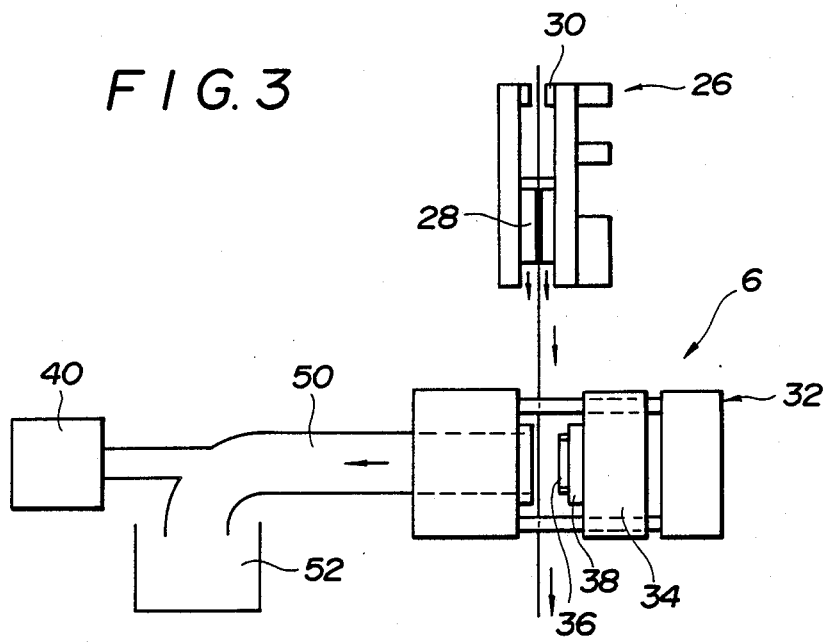
FIGS. 3 through 5 respectively denote the operating status of air-feeder and cutting-line forming means related to the invention.

Next, synchronous with the vertical movement of the conveying device 28 of the air-feeder 26, the operation unit 34 coupled to the driver unit 32 reciprocates itself to the left and to the right. Concretely, when feeding the severable member 16, as shown in FIG. 3, the severable member 16 is initially gripped or sandwiched by the conveying device 28 of the air-feeder 26, and then the conveying device 28 descends to cause the suspended severable member 16 to move downwardly a predetermined distance through the opened cutting means 6.

Figure 4:
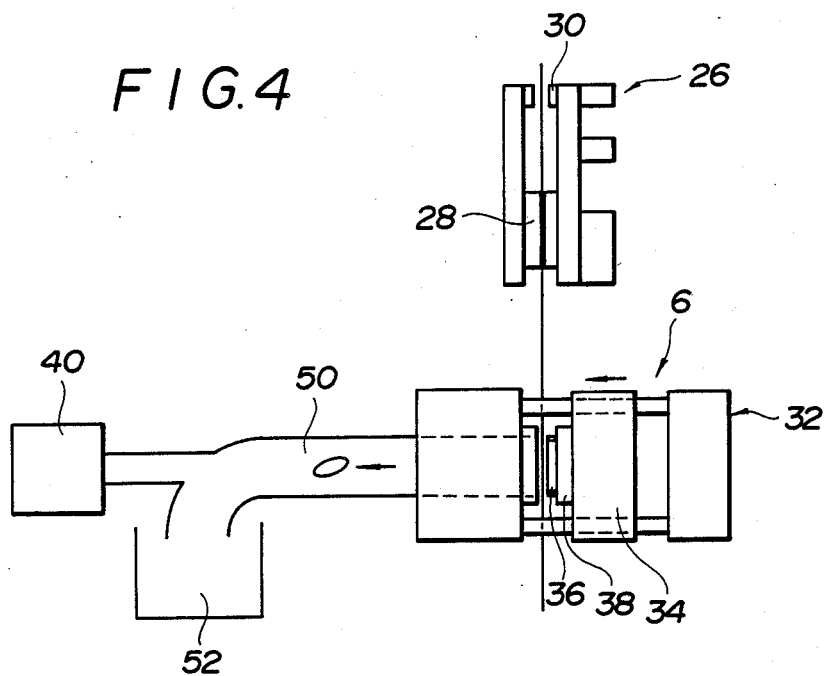

Then, when the conveying device 28 stops at a predetermined lower position, the unit 34 moves to the left, i.e., to the position wherein the blade 36 contacts the severable member 16, as shown in FIG. 4. Blade 36 thus forms cutting lines S1 and S2/S2 of the basic pattern through the severable member 16. Then, useless portion N1 is disengaged from the center of the severable member 16 along cutting line S1 and is quickly delivered to container 52. More specifically, air pressure is supplied by air-suction system 40 to mold 38 which ejects the air pressure against the back side of the cutout N1. This, accompanied by the sucking in tube 50, moves the cutout N1 to the container 52.

Figure 5:
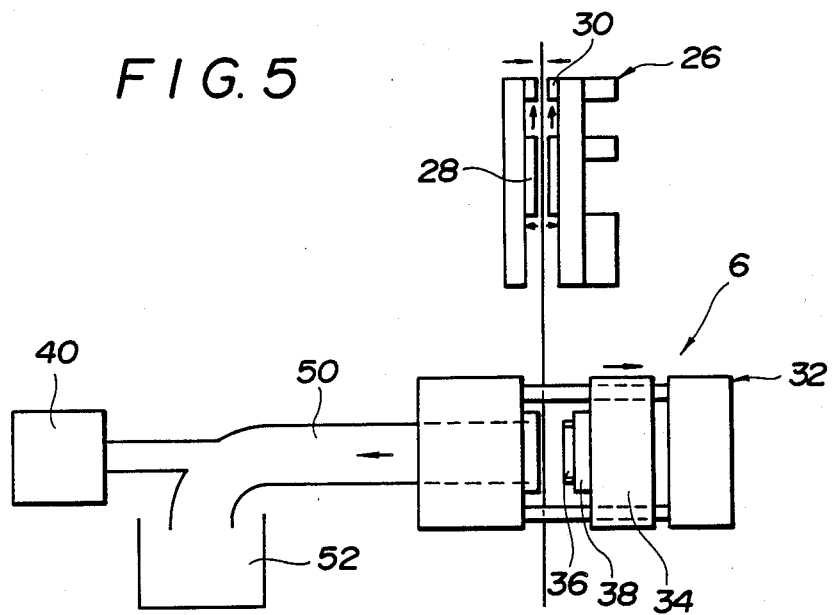

Then, as shown in FIG. 5, material retainer 30 is energized to grip the material 16, and conveying device 28 releases the material and ascends back to its upper position. While the conveying device 28 ascends, material-retainer 30 holds the severable member 16 so that free movement of material 16 is prevented. When the conveying device 28 again grasps the severable member 16, the material-retainer 30 disengages the severable member 16 and the complete cycle is repeated. As a result, blade 36 on the cutting-line forming mold 38 forms cutting line S1 through the severable member 16 after it is vertically delivered downwardly by supply means 4 at a specific interval as shown in FIG. 6, and at the same time blade 36 repeatedly reproduces cutting lines S2 and S2 of the basic pattern covering the predetermined length 1 (which length corresponds to the vertical stroke or displacement of the conveying device 28) for eventually forming continuous cutting lines S3 of the required configuration covering the entire length L of the severable member 16.

After forming cutting line S3 of the required configuration by successive operations of the cutting-line forming means 6, the removal means 8 removes any remaining circular portion N1 and also removes the useless irregular portions N2 and N2 from opposite side edges of the severable member 16, thereby leaving only the essential portion M. The useless circular portion N1 is normally removed by blowing air as supplied from the air-suction system 40 to the mold 34 against the useless circular portion N1, followed by a sucking operation of air-suction system 40. The severable member 16, after removal of the useless circular portions N1, is then wound around takeup roller 42, where the severable member 16 bearing cutting lines S3 is separated into the essential portion M and useless irregular portions N2 and N2. After removal of these useless portions N1 and N2/N2, the severable member 16 (which comprises solely the essential portion M) then receives a specific amount of tension by passing over the roller 43 before being delivered to winding means 10, which then separately winds the layers of soft-material fabric 12 onto separate takeup rollers 46 and also winds the solid base material 14 onto takeup roller 48. Consequently, superimposed severable member 16 which defines only the essential portion M is split into separate layers of soft-material fabric 12 and solid base material 14 before these separate layers are independently wound onto separate takeup rollers 46 and 48.

After continuously being cut and discretely wound onto takeup rollers 46, soft-material fabric 12 is then properly processed during ensuing processes. For example, the essential portion M of soft-material fabric 12 is then cut into a specific length ( and perforated before a liner for a floppy disc is eventually produced.

When continuously forming cutting lines of the basic pattern for a liner, since the second auxiliary blades 66 and 66 repeatedly and continuously follow up the preceding cutting lines S2 and S2 of the basic pattern generated by the first auxiliary blades 64 and 64 during the preceding cutting operation, the following cutting lines S2 and S2 of basic pattern securely follow up and join to the preceding cutting lines S2 and S2, thus allowing continuous cutting lines S3 to be formed in perfect accordance with the required configuration throughout the entire length L of soft-material fabric 12. The cutting-line forming mold related to the invention prevents the following cutting lines S2 and S2 from inconsistently connecting to the preceding cutting lines S2 and S2 and allows all the needed operations to be easily implemented when severing useless portions N1 and N2/N2 from the soft-material fabric.

The soft material cutting apparatus related to the invention is not merely confined to the preferred embodiment cited above, but it is also widely applicable in many ways via modification. For example, the above preferred embodiment allows the severable member to vertically be supplied in a downward direction, and in addition, it also allows the cutting-line forming mold having a blade thereon to be driven by the operation unit in the horizontal direction. However, the preferred embodiment of the apparatus related to the invention also allows the severable member to be conveyed in the oblique direction and the cutting-line forming mold to reciprocate itself in an oblique direction as well. By implementing these substitutive constitutions, the height of the continuous soft-material fabric cutting apparatus of the invention can be lowered, and at the same time, the dimensions of the entire system can be compactly designed. In addition, although the above preferred embodiment has referred to the preparation of liner for use with floppy disc as the object of applying soft-material fabric subject to elongation by effect of tensile force, the potential applicability of the apparatus related to the invention also includes production of other products, such as a gasket and cushion or the like for example.

As is apparent from the above description, the apparatus related to the invention forms cutting lines on the left and right sides of soft-material fabric vertically being supplied in the downward direction. This effectively prevents soft-material fabric from incurring distortion and allows cutting lines to properly and precisely be formed, thus allowing a cutting-line forming operation to be executed smoothly and securely promoting precision of the cutout essential portion as well.

The air feeder 26 will now be described in greater detail with reference to FIGS. 9 and 10.

In the air feeder 26, two guide shafts 262 are arranged almost vertically in parallel therewith below an air feeder main body 261. A conveying device main body 281 of the conveying device 28 is supported on the two guide shafts 262 so as to be vertically movable by only a predetermined distance. The conveying device main body 281 is vertically moved by a pneumatic pressure cylinder. The conveying device main body 281 has a stationary clamp plate 282 and a movable clamp plate 283 which moves sidewardly toward and away from the clamp plate 282 by pneumatic pressure to permit the layers to be clamped therebetween. When the conveying device main body 281 descends by a predetermined distance along the two guide shafts 262 by the pneumatic pressure, the conveying device 28 presses the clamp plate 283 against the conveying clamp plate 282 by the pneumatic pressure, thereby holding the severable member 16. On the other hand, when the conveying device main body 281 ascends along the two guide shafts 262 by the pneumatic pressure, the conveying device 28 moves the other clamp plate 283 away from the clamp plate 282 by the pneumatic pressure, thereby releasing the severable member 16. Due to this, the severable member 16 can be fed at regular intervals from the upper portion to the lower portion.

A holding device main body 301 of the holding device 30 is arranged over the main body 261 of the air feeder 26. The holding device main body 301 has a stationary holding clamp plate 302 and a movable holding clamp plate 303 which moves sidewardly toward and away from the holding clamp plate 302. When the conveying device 28 holds the severable member 16 and descends, the holding clamp plate 303 is moved away from the holding clamp plate 302 by the pneumatic pressure, thereby allowing the severable member 16 to move downwardly. On the contrary, when the conveying device 28 releases the severable member 16 and ascends, the holding device 30 presses the holding clamp plate 303 against the holding clamp plate 302 by the pneumatic pressure, thereby holding the severable member 16 therebetween. Thus, when the conveying device 28 ascends, the severable member 16 is prevented from moving. The severable member 16 can be fed at regular intervals from the upper portion to the lower portion.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or priviledge is claimed are defined as follows:

1. An apparatus for creating substantially continuous cutting lines longitudinally along an elongate sheet-like soft member, comprising:
   cutting means including a pair of horizontally opposed cutting heads adapted to have the sheetlike member positioned therebetween, and drive means for effective relative movement of the cutting heads toward and away from one another for engagement with the sheetlike member when they are relatively moved toward one another;
   one of said cutting heads including thereon a pair of vertically elongated and horizontally sidewardly spaced cutting blades, each said cutting blade being of predetermined length, said cutting blades defining a basic non-linear cut pattern;
   means for vertically moving said sheetlike member in an intermittent step-like manner such that said sheetlike member is repeatedly moved through a predetermined incremental vertical distance which substantially corresponds to the vertical length of said blades; and
   said drive means activating said cutting blades to effect cutting of the soft elongate member following each intermittent advance of the member so that sequentially formed pair of sidewardly spaced cutting lines of predetermined length are continuously joined to form a pair of sidewardly spaced, longitudinally extending continuous cutting lines which extend along substantially the entire length of the soft elongate member, wherein the basic non-linear cut pattern is repeated, each of said cutting blades having a blade portion at one vertical free end thereof which extends at a substantial angle relative to a blade portion at the other vertical free end so that succeeding predetermined length cutting lines intersect.

2. An apparatus according to claim 1, wherein said one cutting head includes a further cutting blade which is disposed sidewardly between the other aforementioned cutting blades, said further cutting blade defining an endless loop.

3. An apparatus according to claim 2, including means for supplying pressurized air to said one cutting head within the area defined by said endless loop to effect removal of the material defined within said endless loop.

4. An apparatus according to claim 1, wherein said one cutting head is adapted for cutting said soft member when said soft member is elongated due to tensile forces, said basic cut pattern being defined by said cutting blades on said one cutting head such that, by applying said basic cut pattern to said elongated soft member, a desired cut pattern results in said soft member when it returns to its normal, non-elongated state.

5. An apparatus for creating substantially continuous cutting lines longitudinally along a sheet-like soft elongate member, comprising:
   a cutting line forming mold having cutting means thereon for forming cutting lines in a basic pattern on the soft elongate member;
   means for moving said soft elongate member downwardly across said mold so as to face said cutting means;
   drive means for periodically driving said mold into engagement with said soft elongate member so that said cutting means repeatedly forms said basic cutting line pattern thereon, said soft elongate member moving means including means for stepwise feeding said soft elongate member across said mold synchronously with said periodic driving of said mold into engagement with said soft elongate member by said drive means, said cutting line forming mold having thereon a plurality of auxiliary blades which, while said cutting means forms said basic cutting line pattern in said elongate soft member, cut said soft member so as to connect the basic cutting line pattern which is currently being formed therein to a basic cutting line pattern which was previously formed therein and which is adjacent the pattern currently being formed, said cuts formed by said auxiliary blades connecting the currently formed basic cutting line pattern with the previously formed adjacent cutting line pattern to form cutting lines in said elongate soft member which extend continuously longitudinally along substantially the entire length of said soft elongate member.

* * * * *